(12) United States Patent
Wang et al.

(10) Patent No.: US 10,599,121 B2
(45) Date of Patent: Mar. 24, 2020

(54) IRRIGATION CONTROLLER

(71) Applicant: YUAN-MEI CORP., Changhua County (TW)

(72) Inventors: King-Yuan Wang, Changhua County (TW); Chi-Han Cheng, Changhua County (TW)

(73) Assignee: YUAN-MEI CORP., Changhua County (TW)

(*) Notice: Subject to any disclaimer, the term of this patent is extended or adjusted under 35 U.S.C. 154(b) by 412 days.

(21) Appl. No.: 14/667,706

(22) Filed: Mar. 25, 2015

(65) Prior Publication Data

US 2016/0282833 A1 Sep. 29, 2016

(51) Int. Cl.
*G05B 19/10* (2006.01)
*A01G 25/16* (2006.01)

(52) U.S. Cl.
CPC ......... *G05B 19/108* (2013.01); *A01G 25/165* (2013.01); *G05B 2219/23067* (2013.01); *G05B 2219/2625* (2013.01)

(58) Field of Classification Search
CPC ........ G05B 19/108; G05B 2219/23067; G05B 2219/2625
USPC ....................................................... 700/284
See application file for complete search history.

(56) References Cited

U.S. PATENT DOCUMENTS

| | | |
|---|---|---|
| 1,865,965 A | 7/1932 | Ruiz |
| D191,294 S | 9/1961 | Charnota |
| 4,165,532 A | 8/1979 | Kendall |
| 4,189,776 A | 2/1980 | Kendall |
| 4,560,020 A | 12/1985 | Mambelli |
| 4,646,224 A | 2/1987 | Ransburg |
| 4,797,820 A | 1/1989 | Wilson |
| 4,827,155 A | 5/1989 | Firebaugh |
| 4,852,051 A | 7/1989 | Mylne, III |
| 4,937,732 A | 6/1990 | Brundisini |
| 4,937,746 A | 6/1990 | Brundisini |
| 4,943,917 A | 7/1990 | Mylne, III |
| 4,951,204 A | 8/1990 | Mylne, III |
| 5,038,268 A | 8/1991 | Krause |
| 5,097,861 A | 3/1992 | Hopkins |
| 5,262,936 A | 11/1993 | Faris |
| 5,272,620 A | 12/1993 | Mock |
| 5,479,338 A * | 12/1995 | Ericksen ................ A01G 25/16 137/624.2 |
| 6,442,440 B1 | 8/2002 | Miller |
| 7,203,576 B1 | 4/2007 | Wilson |
| D621,794 S | 8/2010 | Haeske |
| 8,160,750 B2 | 4/2012 | Weiler |
| D676,768 S | 2/2013 | Eyring |

(Continued)

*Primary Examiner* — Kenneth M Lo
*Assistant Examiner* — Chad G Erdman
(74) *Attorney, Agent, or Firm* — Raymond Y. Chan; David and Raymond Patent Firm

(57) ABSTRACT

An irrigation controller is revealed. The irrigation controller includes a user interface presenting information to users, easily-operated by buttons and allowing users to program irrigation related information directly. The user interface is composed of a round display, a plurality of program keys, and a selective key. An indicator and programmable information zones are shown on the round display. There are at least six programmable information zones. The information zone is selected by a single selective key. The indicator is moved in one direction in a circular path.

4 Claims, 3 Drawing Sheets

(56) References Cited

U.S. PATENT DOCUMENTS

| | | | |
|---|---|---|---|
| D679,205 S | 4/2013 | Eyring | |
| D705,094 S | 5/2014 | Eyring | |
| 2006/0092130 A1* | 5/2006 | Choquet | B60H 1/00985 345/156 |
| 2006/0184284 A1* | 8/2006 | Froman | A01G 25/165 700/284 |
| 2009/0210815 A1* | 8/2009 | Cheng | G06F 3/0236 715/773 |
| 2009/0227855 A1 | 9/2009 | Hill | |
| 2010/0230510 A1* | 9/2010 | Wilson | A01G 25/16 239/70 |
| 2011/0106320 A1 | 5/2011 | Hall | |
| 2014/0058567 A1* | 2/2014 | Matsuoka | G05D 23/1917 700/276 |
| 2014/0195059 A1 | 7/2014 | Weiler | |
| 2014/0229025 A1 | 8/2014 | Nickerson | |
| 2014/0249684 A1 | 9/2014 | Nickerson | |
| 2014/0316581 A1* | 10/2014 | Fadell | F24F 11/0009 700/276 |
| 2016/0058337 A1* | 3/2016 | Blahnik | A61B 5/1112 600/595 |
| 2016/0139582 A1* | 5/2016 | Matsuoka | G05D 23/1917 700/276 |

* cited by examiner

IRRIGATION CONTROLLER

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to an irrigation timer, and more particularly to an irrigation controller which is adapted to program the irrigation time, date, number of days, irrigation duration, and etc., and provides such scheduled irrigation information in an user interface for its users.

Description of Related Arts

U.S. Pat. Nos. 8,160,750 and D713,271 teach a conventional programmable irrigation controller, having an user interface, for connecting to switchable valves of irrigation devices to control water flow. In order to control the delivery of water to various irrigation districts or zones, watering days with different definitions and their respective start times are generally provided for the user's irrigation devices of the conventional programmable irrigation controller. In addition, the date starting to watering and the schedule of each watering date as well as the watering mode program are defined and provided, wherein the user is able to select the proper program for the specific district or zone so as to provide watering with respect to each switchable watering valve. Therefore, the user may program and schedule watering according to the watering condition of specific watering district or zone so as to enable the irrigation controller to execute watering according to the programmed watering schedule automatically.

Referring to U.S. Pat. No. 8,160,750, a programmable irrigation controller is disclosed, which includes a housing, a microcontroller, a valve driver, and an user interface. The user interface consists of a rotary dial, a plurality of functionality labels marking a plurality of selectable positions of the rotary dial respectively, a LCD, first and second multi-function adjustment button groups, first and second system variable indicators, a group of irrigation frequency adjustment buttons, a plurality of irrigation frequency indicators, a plurality of irrigation frequency labels, a group of irrigation start day adjustment buttons, a plurality of irrigation start day indicators, a plurality of irrigation start day labels, a manual start button, a manual duration adjust indicator, and a language adjust button. As to the controller of the U.S. Pat. No. D713271, it includes a rotary dial, a semi-circular display, switches, and buttons, wherein the rotary dial is provided around an outer diameter of the semi-circular display.

According to the above conventional user interface, it is required to rotate the rotary dial to change the information mode. In other words, in order to change of the information model, the rotary dial must be operated by rotation to switch the selection to program irrigation related information. Per each switching of programmed mode, the rotary dial must be operated by another rotation thereof and then to operate the respective button and switch correspondingly. Such conventional operation interface requires the user to use his or her both hands to operate when he or she needs to operate rapidly.

Furthermore, the semicircular display would be covered by the hands operating the rotary dial of the user that prevents the user from fully observing the selection of the information mode of the semicircular display during switching and changing of the irrigation-related information on the semicircular display. Therefore, the user has no choice and is required to firstly rotate the rotary dial with his or her hand and then withdraw his or her hand from the rotary dial completely to operate the buttons or switches to program the irrigation-related information mode. This is a major drawback in operation of the conventional user interface of the irrigation controller. In addition, the LCD 206 display revealed in U.S. Pat. No. 8,160,750 is rectangular while the LCD display in D713271 is semicircular. Thus, the programming and selection of the information must be operated by rotating the rotary dial clockwise or counterclockwise or by pointing the indicator upward or downward. The rotary dial or the indicator is operated in two directions. In other words, the operation of the rotary dial for programming and selection of the information mode must be operated by rotation in two directions and, after the rotation operation, the programming and selection operation has to be completed by the further operation of the buttons or switches.

SUMMARY OF THE PRESENT INVENTION

Therefore it is an object of the present invention to provide an irrigation controller without using any rotary dial for changing selection of the driving information modes, wherein a plurality of information modes is selected and switched by an operation of a single selective key that enables an one-hand operation of the changing of selection of the driving information modes by the user.

In order to achieve the above object, an irrigation controller of the present invention is provided, which includes a housing and an user interface disposed on the housing.

The housing, having a water inlet and a water inlet, comprises an information controller and a plurality of valves provided therein. The valves are provided in one end or two ends of the housing. The water inlet is provided at one side of the housing for connection to a water source, wherein an output end of the water inlet is connected to the respective valve. The water outlet is provided at one side of the housing, wherein an input end of the water outlet is connected to the corresponding valve.

The information controller has memory portions for storing and execution various information modes, including memory portions related to irrigation schedule information such as automatic irrigation, manual irrigation, clock set, start time, duration for watering, irrigation frequency, power saving, valve selection, and etc. According to a signal from the memory, the information controller outputs a signal to the valve for opening or closing the valve.

The user interface is disposed on an outer surface of the housing, used for presenting information to users, easily operated by buttons, and allowing users to learn and program irrigation related information directly. By the user interface, users can set a plurality of information zones including a first information zone, a second information zone, a third information zone, a fourth information zone, a fifth information zone, a six information zone, a seventh information zone, a eighth information zone, each of which has corresponding information related to irrigation.

The user interface is coupled to the information controller and used to provide signals to the information controller connected according to user's settings. Thus users can create an irrigation schedule.

The user interface consists of a round display (such as a dot-matrix LCD), an indicator and a plurality of program buttons. The round display is connected to an information controller and is used for presenting information related to irrigation parameters to users. Thus users can directly learn the programmed information or changes in the information shown on the round display after the information being programmed. The indicator is shown on the round display and pointing to various information zones including the first information zone, the second information zone, the third information zone, the fourth information zone, a fifth information zone, the sixth information zone, the seventh information zone, and the eighth information zone. The information zone is selected by operating a single select key while the indicator pointing to the information zone is moved in a single direction of a circular path.

The selective key is arranged at surface of one side of the user interface and used for switching the information zone.

There are at least two program buttons set on surface of one side of the user interface, arranged around the selective key, and used for programming the information zone.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
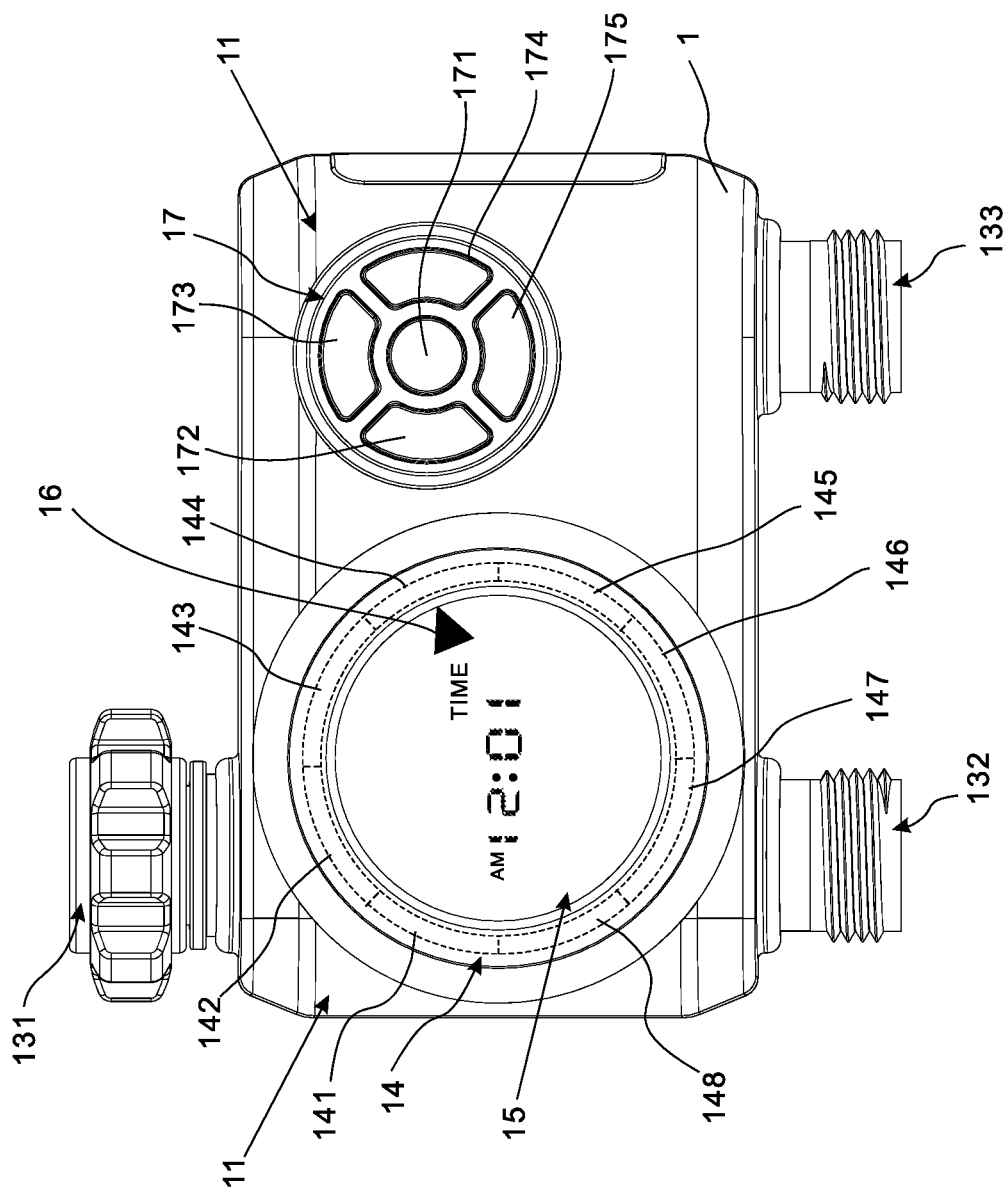
FIG. 1 is a front view of an embodiment according to the present invention.
Figure 2:
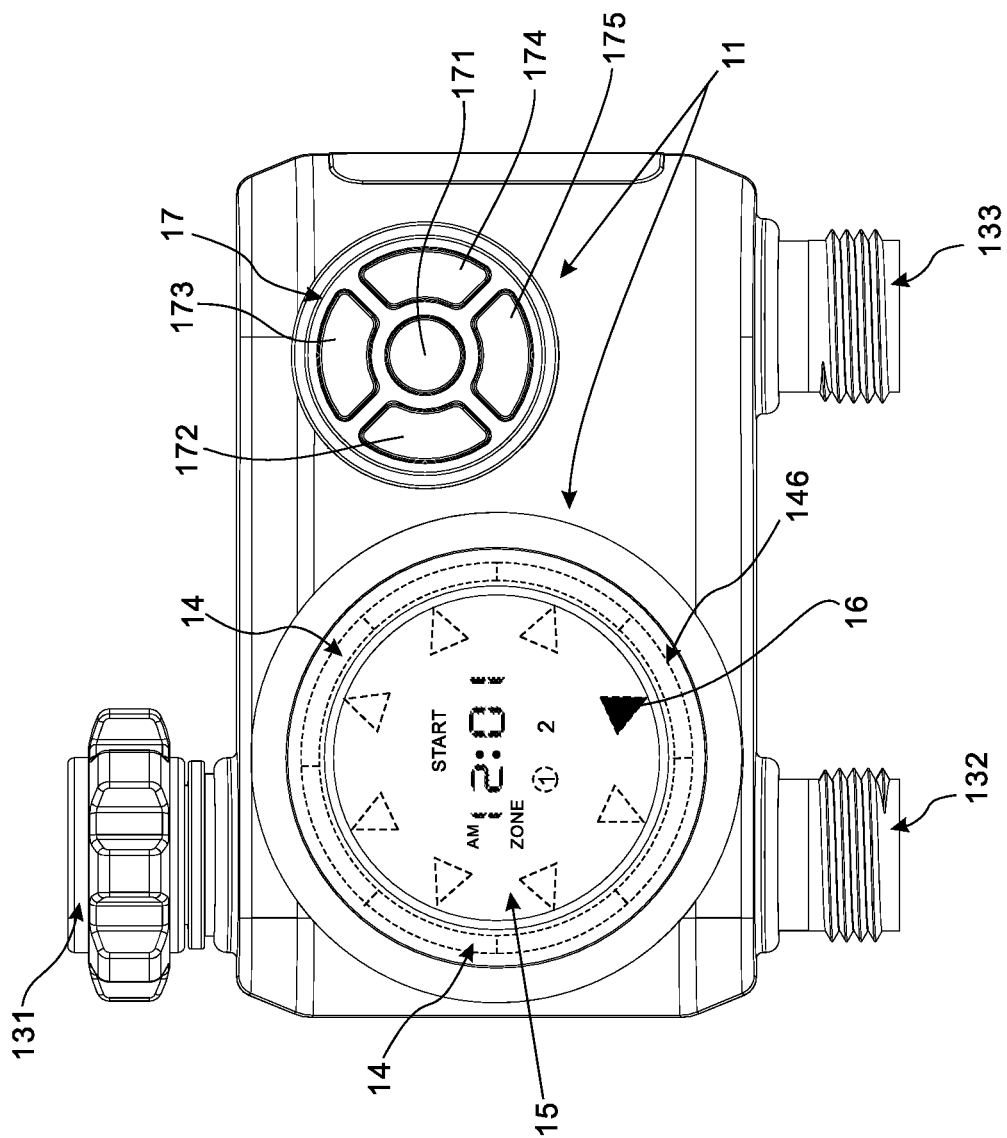
FIG. 2 is a perspective view of an embodiment in use according to the present invention.
Figure 3:
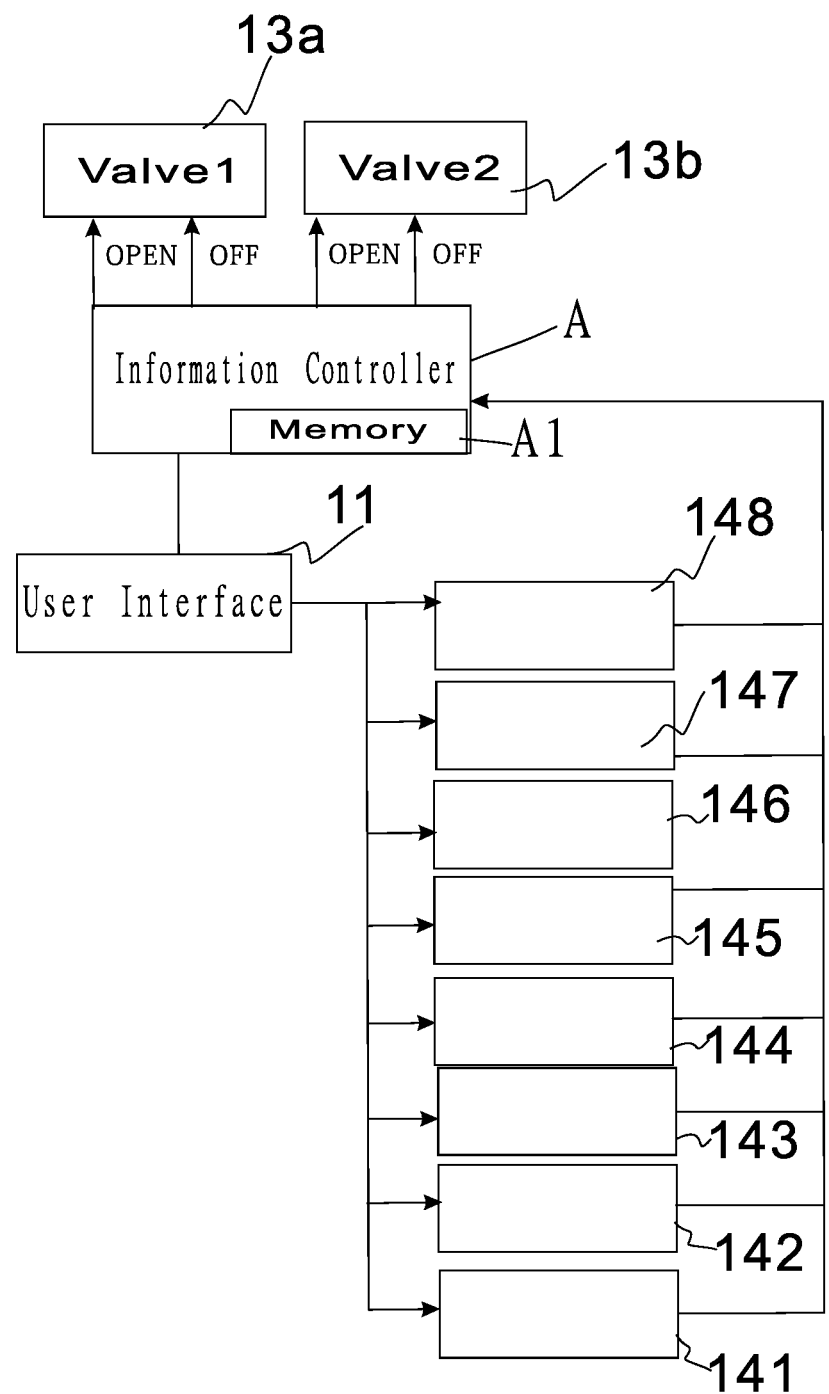
FIG. 3 is a schematic drawing showing an user interface according to the present invention.

Refer to FIG. 1, FIG. 2 and FIG. 3, an irrigation controller includes a housing 1 and a user interface 11 disposed on an outer surface of the housing 1. The housing 1 includes an information controller A, valves 13a, 13b, a water inlet 131 and a plurality of water outlets 132, 133. The information controller A, and the valves 13a, 13b are mounted in the housing 1. The valves 13a, 13b are set in one end or two ends of the housing 1. The water inlet 131 at one side of the housing 1 is used for connection to a water source and an output end of the water inlet 131 is connected to the valves 13a, 13b. The water outlets 132, 133 are arranged at one side of the housing 1 and an input end of each water outlets 132/133 is connected to the corresponding valve 13a/13b. The information controller A includes a memory A1 that stores and executes a plurality of watering related information zones 14 including a first information zone 141, a second information zone 142, a third information zone 143, a fourth information zone 144, a fifth information zone 145, a sixth information zone 146, a seventh information zone 147, and an eighth information zone 148, each of which has corresponding information related to irrigation such as time or procedures. According to a signal from the memory A1, the information controller A outputs a signal to the valve 13a or the valve 13b for opening or closing the valve 13a/13b.

The user interface 11 displays the information zones 14 to users. The user interface 11 can be easily operated by buttons and users can learn and program the information zones 14 directly. The use interface 11 is used to program a plurality of information zones 14 including the first information zone 141, the second information zone 142, the third information zone 143, the fourth information zone 144, the fifth information zone 145, the sixth information zone 146, the seventh information zone 147, and the eighth information zone 148. The user interface 11 is coupled to the information controller A and used for providing signals to the coupled information controller A according to users' settings. Thus users can set up an irrigation schedule. The user interface 11 is connected to the information controller A for providing signals to the information controller A based on user's programming so as to create the irrigation schedule.

The user interface 11 consists of a round display 15 (such as a dot matrix liquid crystal display), an indicator 16 (such as an arrow) and a plurality of program buttons 17. The button is only an embodiment of the present invention. The button can also be other triggering element. The round display 15 is disposed on one side of the user interface 11 while the program buttons 17 are arranged at the other side of the user interface 11. The round display 15 is connected to the information controller A and is used for showing information related to irrigation parameters. Thus users can directly learn the programmed information or changes in information related to irrigation parameters shown on the round display 15 after the information related to irrigation parameters being programmed. The round display 15 also shows the indicator 16 pointing to programmable irrigation zones and the information zone selected. The indicator 16 is used to indicate a plurality information zones 14 including a first information zone 141, a second information zone 142, a third information zone 143, a fourth information zone 144, a fifth information zone 145, a sixth information zone 146, the seventh information zone 147, and the eighth information zone 148. The information zone is selected by operating a single select key 171. The indicator 16 pointing toward the information zone shown now is moved in a predetermined direction of a circular path, as shown in FIG. 2.

The information corresponding to the information zone 14 are shown circularly around the round display 15. Each information zone 146-148 has corresponding irrigation related information shown in words or figures. The indicator 16 pointing to the information zone selected is moved in a circular path.

The program buttons 17 include a select key 171 and a plurality of program keys 172, 173, 174, 175. The program buttons 17 is arranged at one side of the housing 1, opposite to the side disposed with the round display 15. In this embodiment, the plurality of program keys 172, 173, 174, 175 is arranged around the select key 171. The positions of the program buttons 17 are not limited. The position of the select key 171 can be changed to the position of the program key 172 or the program key 173.

The indicator 16 is moved by operating the select key 171. That means users can select one of the information zones 14 they intend to program by an operation of the select key 171. The indicator 16 is shifted to the next spot in a predetermined direction by clicking the select key 171 once. The indicator 16 is moved in a circular path.

In this embodiment, the information zones 14 include eight zones 141-148. The first information zone 141 is used to set up automatic irrigation. After the irrigation related information being programmed by the user, the programmed irrigation schedule is performed automatically if the user selects the first information zone 141.

The second information zone 142 is used to set up manual irrigation. After the second information zone 142 being manually activated, the user is allowed to manually operate the program key 175 for selecting opening of the valve 13a, opening of the valve 13b, closing of the valve 13a or closing of the valve 13b for watering. Thus whether a specific zone is watered or not can be controlled.

The third information zone 143 is use to program the clock set at the moment. The clock can be adjusted according to users' requirements. When the "clock set" mode is selected, the time (hour and minute) now is shown on the round display 15. The user can adjust the hour and minute settings by the program buttons 172, 174.

The fourth information zone 144 is used for setting a start time to initiate watering and allowing users to operate the program key 175 and select opening of the valve 13a, opening of the valve 13b, closing of the valve 13a or closing of the valve 13b for watering. The start time includes the number of hour(s) and the number of minute(s). For example, 12:01 represents confirmed start time to initiate watering. The number of hour(s) and the number of minute (s) are adjusted by the program keys 172, 174.

The fifth information zone 145 is used to program duration for watering. The duration means how long the watering continues. The duration can be set from 1 to 360 minutes. For example, 5 represents water is applied for 5 minutes.

The sixth information zone 146 is used to set irrigation frequency such as several days or hours. The irrigation frequency means how often the watering is performed. For example, 3 days represents that the irrigation is repeated each three days. 1 hour represents that watering is applied once each hour. The frequency is modified by the program keys 172, 174 to increase or decrease the daily or hourly interval.

The seventh information zone 147 is for power saving.

The eighth information zone 148 is used for selection of other valves.

The user learns the information directly on the round display 15 for programming the irrigation schedule. The user can select the information zone or switch among various information zones by operating a single select key 171 to move the indicator 16. Each time the select key 171 is clicked, the indicator 16 on the round display 15 is shifted to the next spot of a circular path in a predetermined direction so as to switch to another information zone 14. In the user interface 11 of the embodiment of FIG. 1, the indicator 16 pointing to the fourth information zone 144 is shown on the round display 15. In the user interface 11 of the embodiment of FIG. 2, the indicator 16 pointing to the sixth information zone 146 is shown on the round display 15.

In summary, the present invention features on that the indicator 16 is shifted to the next spot of a circular path in a predetermined direction. Thereby one of the plurality of information zones 14 arranged around the round display 15 including the first information zone 141, the second information zone 142, the third information zone 143, the fourth information zone 144, the fifth information zone 145, the sixth information zone 146, the seventh information zone 147, and the eighth information zone 148 can be selected. The selective key 17 is operated by a single hand and user's hand will not cover the round display 15. The selection and programming of the information zone is simple and rapid. Moreover, the housing 1 can be disposed with only the information controller A and the user interface 11. The valves 13a, 13b, the water inlet 131 and the water outlets 132, 133 are arranged at another housing. The housing with valves 13a, 13b is connected to the housing 1.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An irrigation controller connected to irrigation devices with switchable valves for control of water flow, comprising:
   a housing having an information controller with memory, a water inlet, at least a water outlet arranged for connecting to a valve, and a plurality of information zones including information of automatic irrigation, manual irrigation, clock set, start time, duration for watering, irrigation frequency, power saving, and valve selection, wherein the memory is configured for storing and executing the information zones, wherein the information controller is coupled with the valves, so that the output signal of the information controller based on a signal from the memory is capable of being transmitted to the valves to control opening or closing of the valves; and
   a user interface disposed on an outer surface of the housing, wherein the user interface comprises a round display, a single indicator and a plurality of program buttons, wherein the round display is disposed on one side of the housing, and the program buttons are disposed on an opposite side of the housing, wherein the information zones are displayed around the periphery of the round display, and the indicator is displayed on an inner periphery of the round display for selectively pointing to and indicating one of the information zones, such that the round display displays not only the information zones with their corresponding information but also the indicator, wherein the program buttons comprises a selective key configured for moving the indicator to point to the information zone selected, and at least two program keys operable to program the information zones so as to make the information of the information zone selected be selectively and simultaneously displayed on the round display, wherein said program keys are arranged around said selective key, wherein when the selective key is actuated, the indicator is shifted in a circular path along the inner periphery of the round display so as to switch from one information zone to another information zone.

2. The irrigation controller connected to irrigation devices with switchable valves for control of water flow, as recited in claim 1, wherein the inner round display is configured for presenting the information related to the information zone selected after the information zone selected is programmed.

3. The irrigation controller connected to irrigation devices with switchable valves for control of water flow, as recited in claim 1, wherein the user interface is coupled with the information controller to allow a user to create an irrigation schedule through providing setting signals to the information controller, wherein the information zones comprises an automatic irrigation information zone, and when the automatic irrigation information zone is selected, the irrigation schedule is automatically performed.

4. The irrigation controller connected to irrigation devices with switchable valves for control of water flow, as recited in claim 2, wherein the user interface is coupled with the information controller to allow a user to create an irrigation schedule through providing setting signals to the information controller, wherein the information zones comprises an automatic irrigation information zone, and when the automatic irrigation information zone is selected, the irrigation schedule is automatically performed.

* * * * *